Figure 1:
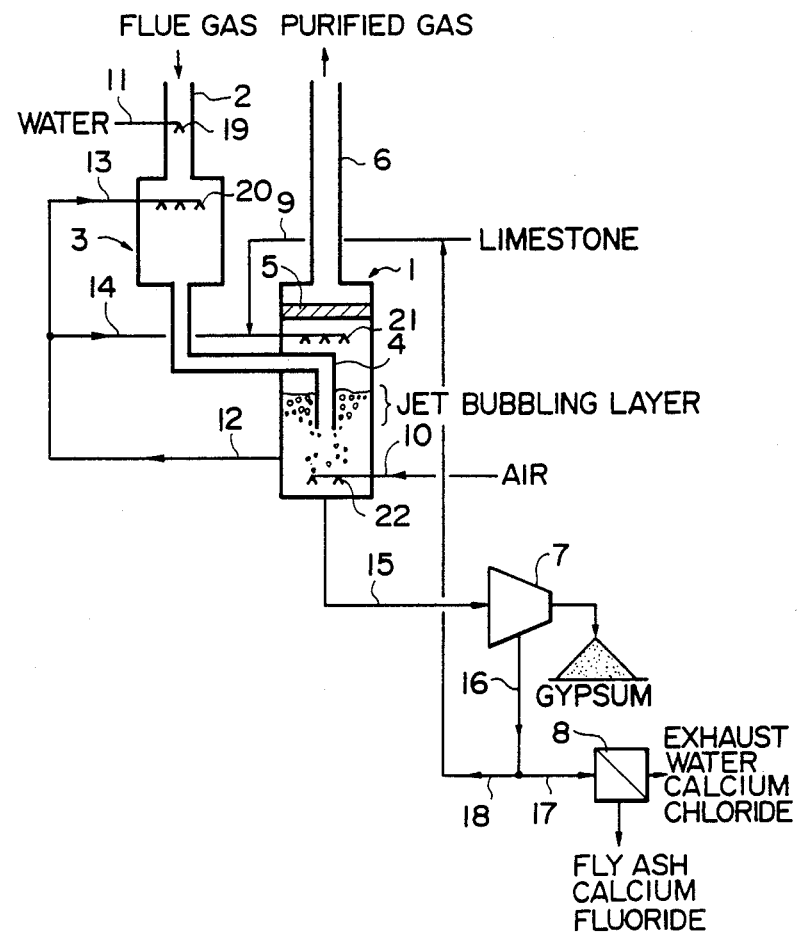

United States Patent [19]

Ogawa et al.

[11] Patent Number: 4,911,901
[45] Date of Patent: Mar. 27, 1990

[54] WET DESULFURIZATION PROCESS FOR TREATING A FLUE GAS

[75] Inventors: Yoshio Ogawa, Tokyo; Naobumi Hashimoto; Kazushige Kawamura, both of Kanagawa; Akira Kumagai, Tokyo; Toshiaki Urata, Kanagawa; Yoshiaki Komatsubara, Tokyo, all of Japan

[73] Assignee: Chiyoda Corporation, Japan

[21] Appl. No.: 243,271

[22] Filed: Sep. 12, 1988

[30] Foreign Application Priority Data

Sep. 16, 1987 [JP] Japan .................. 62-231717

[51] Int. Cl.$^4$ ............................................. C01B 17/00
[52] U.S. Cl. ..................................................... 423/242
[58] Field of Search ........... 423/240 R, 240 S, 242 A, 423/242 R, 244 A, 244 R

[56] References Cited

U.S. PATENT DOCUMENTS

| | | | |
|---|---|---|---|
| 3,520,113 | 7/1970 | Stokes | 423/242 |
| 3,615,165 | 10/1971 | Clement | 423/242 |
| 3,885,929 | 5/1975 | Lyon et al. | 55/87 |
| 4,099,925 | 7/1978 | Yanagioka et al. | 423/242 |
| 4,148,615 | 4/1979 | Agarwal et al. | 55/73 |

FOREIGN PATENT DOCUMENTS 0277246  8/1988  European Pat. Off. .
3320743  12/1984  Fed. Rep. of Germany .

*Primary Examiner*—Gregory A. Heller
*Attorney, Agent, or Firm*—Lorusso & Loud

[57] ABSTRACT

A process for treating a flue gas containing sulfur dioxide and fly ash is disclosed in which an aqueous absorbent liquid is sprayed into the glue gas stream, and the resulting gas is fed to a vertical, open-ended pipe to form a jet annular stream, so that portions of the $SO_2$ and the fly ash contained in the flue gas are transferred to the liquid phase. The jet annular stream is then sparged into the aqueous absorbent held in a well-mixed vessel to form a jet bubbling layer in a shallow, upper region of the aqueous absorbent, so that a greater part of the $SO_2$ and the fly ash are removed from the gas. Air is introduced into a deep lower region of said aqueous absorbent to provide streams of fine oxygen-containing gas bubbles throughout the whole vessel, so that the absorbed $SO_2$ and other sulfites are oxidized to form coarse gypsum crystals while COD of the absorbent is reduced.

6 Claims, 2 Drawing Sheets

WET DESULFURIZATION PROCESS FOR TREATING A FLUE GAS

This invention relates to a wet desulfurization process for treating a flue gas and, more particularly, to a method of efficiently and totally removing $SO_2$ and other air pollutants, especially HF, HCl and dust (fly ash) contained in a flue gas.

Wet desulfurization processes in which a flue gas is contacted with a solution or slurry containing an absorbent for removing air pollutants such as $SO_2$ and fly ash therefrom are widely known. Various such processes have been hitherto proposed and a number of large commercial apparatuses are actually employed for the treatment of flue gas from thermal power boilers, etc. Of these processes, processes in which limestone is used as the absorbent and in which gypsum is produced as a by-product are most commonly used. As a $SO_2$ absorbing tower which represents the central apparatus such processes, many types of absorbing towers have been adopted. Spray towers and packed towers are typical absorbing towers. However, the former towers have an advantage that a gas-liquid contact space is structurally sparse so that they withstand scaling and clogging, whereas the latter towers provide a high $SO_2$ removal efficiency because the gas-liquid contact is effected along tortuous paths. The spray towers consume much electric power and require large installation costs because, for example, it is necessary to recirculate a large amount of absorbent slurry liquid by means of a large, high-water head pump in order to form fine particulates and to effect the gas-liquid contact. Further, since the absorbent slurry liquid recirculating pump must be actuated and stopped according to the start, the stop and the load variations of the boiler, the control of the operation becomes complicated. The packed towers, on the other hand, suffer from drawbacks because they require a large gas-liquid contact volume and because solids are apt to be accumulated, thereby causing clogging due to the tortuous passages through which gas and absorbent slurry liquid flow and rendering the removal of scale difficult. Additionally, neither compact and, therefore, they require a large installation area. Especially, flue gas discharged from boilers using coal as fuels contains a relatively large amount of dusts called fly ash and, additionally, air pollutants such as HCl and HF, depending upon the kind of the coal. Thus, it is necessary to establish an economical method of treating flue gas in which the removal by absorption of these pollutants is also totally taken in consideration in addition to the removal of $SO_2$. The HCl and HF which are contained in the flue gas in amounts of, for example, as high as about 200 ppm and 150 mmp, respectively, can react with the limestone supplied for absorbing $SO_2$ because of their tendency to react with calcium compounds to form $CaCl_2$ and $CaF_2$. During the course of such reactions, the removal by absorption of $SO_2$, which is the primary object, is obstructed. In wet, flue gas desulfurization systems using the conventional types of absorbing towers, therefore, phenomena of abrupt reduction of $SO_2$ removal rate and considerable reduction of limestone utilization are factors which lead to the lowering of the reactivity of the limestone-containing slurry which is often observed.

The present invention has been made with a view toward overcoming the above-mentioned problems and has as its object the provision of a process by which a flue gas is efficiently purified by totally treating not only $SO_2$ but also air pollutants which include fly ash, HCl and HF and which are contained in a larg amount in coal boiler flue gas.

In accordance with the present invention air pollutants such as sulfur dioxide and fly ash contained in a flue gas are removed therefrom by a process which comprises the steps of:

(a) spraying an aqueous absorbent containing gypsum as well as a calcium compound such as limestone or slaked lime into a scrubber for direct contact with the flue gas;

(b) introducing the flue gas into the scrubber through a vertical, open-ended pipe to form an annular jet stream or a gas-continuous flow accompanied with liquids and solids, so that portions of the $SO_2$ and the fly ash contained in the flue gas are transferred to the liquid;

(c) sparging annular jet stream from the above vertical, open-ended pipe into said pool of aqueous absorbent held in a well-mixed vessel to form a jet bubbling layer or a liquid/solid/gas three phase mixed layer, which contains fine bubbles in the liquid-continuous phase of a shallow upper region of the aqueous absorbent, so that a greater part of the $SO_2$ and the fly ash are removed from the gas;

(d) dispersing air into said pool in said reactor below said jet bubbling layer to provide streams of fine oxygen-containing gas bubbles throughout the whole vessel including the jet bubbling layer, so that the absorbed $SO_2$ and other sulfites are oxidized to form coarse gypsum crystals while chemical oxygen demand (COD) of the absorbent is reduced; and (e) withdrawing a portion of the aqueous absorbent to maintain the concentration of the gypsum in a predetermined range.

As the absorbent, there may be used any reagents as long as they can react with $SO_2$. Thus, sodium compounds, magnesium compounds and ammonium compounds, such as sodium hydroxide, magnesium hydroxide and ammonia, may be used in the process of the present invention. While these compounds are generally more expensive than calcium compounds, they provide the advantage that the resulting absorbing liquid is not in the form of slurry.

It is preferred that a liquid containing an alkali-type absorbent such as slaked lime be sprayed densely into the gas separate from the jet bubbling layer to substantially completely remove the air pollutants from the gas.

It is also desirable to previously partly cool the high temperature flue gas when the flue gas contains a large amount, say 200 mg/$Nm^3$, of fly ash. By this the fly ash can be recovered separately from gypsum.

In another aspect, the present invention provides a process for treating a flue gas containing sulfur dioxide and fly ash, comprising the steps of:

(a) introducing the flue gas into a humidifying zone to bring the flue gas into direct contact with a humidifying liquid sprayed within said humidifying zone and to obtain a mixture containing humidified flue gas;

(b) introducing said mixture from said humidifying zone into a mixing zone having one or more vertical tubes each extending into a reactor (scrubber) and each of the tubes having an inside diameter such that said mixture flows therethrough at a high speed to form a jet flow which consists of gas, liquid and solid phases and in which the gas phase forms a continuous phase, so that a portion of the fly ash is caught by the liquid phase with a portion of the sulfur dioxide being absorbed in the liquid phase;

(c) injecting said jet flow into an absorbent-containing slurry contained in said reactor to form in an upper portion of the slurry a jet bubbling layer which consists of gas, liquid and solid phases and in which the liquid phase forms a continuous phase, so that the sulfur dioxide contained in the gas phase of said jet bubbling layer is absorbed in the slurry with the fly ash contained in the solid phase of said jet bubbling layer being caught by the slurry;

(d) discharging a first portion of the slurry beneath said jet bubbling layer from said reactor and recycling same to said humidifying zone as at least part of said humidifying liquid; and (e) discharging a second portion of the slurry beneath said jet bubbling layer from said reactor for recovery.

Preferably this process further comprises the steps of:

(f) bringing the gas leaving said jet bubbling layer into direct contact with a scrubbing liquid sprayed in an upper space above said slurry within said reactor for scrubbing;

(g) withdrawing the scrubbed gas from said reactor; and (h) discharging a third portion of the slurry beneath said jet bubbling layer from said reactor and recycling same to step (f) as part of said scrubbing liquid.

An oxygen-containing gas is preferably fed into the slurry collected in the lower portion of the reactor and is allowed to be bubbled through the slurry for oxidizing sulfurous acid and sulfites formed in situ to sulfates such as gypsum.

Figure 2:
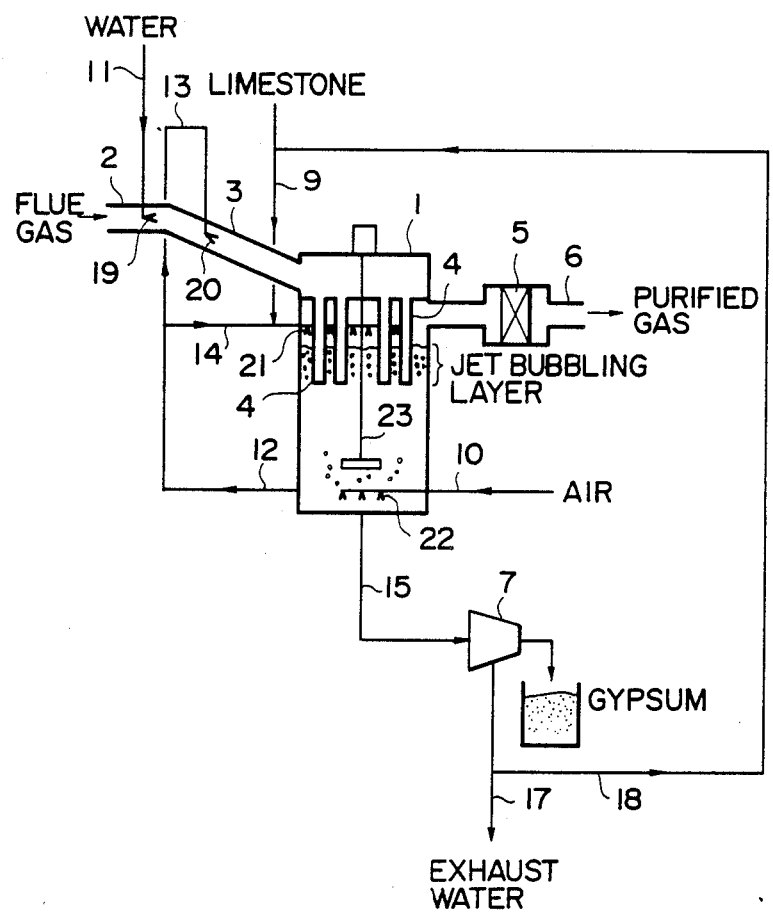

The present invention will now be described in detail below with reference to the accompanying drawings, in which:

FIG. 1 is a schematic illustration of a flue gas treating apparatus used in the present invention; and FIG. 2 is a schematic illustration of a flue gas treating apparatus used in the Example.

Referring to FIG. 1, in which embodiment limestone is used as an absorbent, flue gas discharged from a boiler, a heating furnace, an incinerator, a sulfuric acid plant or the like plant is introduced into a flue gas inlet pipe 2 where make-up water supplied through a conduit 11 is sprayed from a nozzle 19. Thereafter, the flue gas is humidified and cooled in a gas cooling and humidifying apparatus 3 by spray from a nozzle 20 of an absorbing liquid which contains limestone and gypsum and which is supplied from a reactor 1 through conduits 12 and 13.

The flue gas, which has generally a high temperature of about 130°–200° C., is first quenched by contact with water. Since, in the present invention, the flue gas is contacted with the absorbent-containing liquid, the pH of the liquid decreases to about 4–5. This is advantageous from the standpoint of material quality. That is, when the flue gas is cooled directly with mere water, the pH is decreased to 1 or less so that a high quality material is needed. Further, whilst solids are unavoidably formed as a result of the evaporation of water since the liquid in which gypsum is dissolved is used, no clogging occurs because the step is performed in a spray mode having only a sparse internal.

Then, the mixture of the flue gas and the absorbent slurry is passed through a pipe 4 into the reactor 1. Since the mass transfer efficiency is high because of the large surface area as a result of the fineness of the liquid particles and because the mixture is passed through the pipe 4 at a high speed, portions of the $SO_2$, fly ash, HCl and HF are removed from the gas as it passes through pipe(s) 4. Further, as a result of the contact with the absorbent slurry liquid, the $SO_2$ is transferred to the liquid in the form of sulfurous acid or sulfites which, in turn, react with $O_2$ remaining in the flue gas to newly form gypsum within the pipe 4. However, since gypsum is originally contained in the liquid within the pipe 4 and since this gypsum serves as seed crystals, scaling of gypsum is prevented.

The high speed, gas/liquid/solid three-phase stream in which the gas forms a continuous phase is ejected from the lower end of the pipe 4 into an upper, shallow layer of the limestone and gypsum-containing, absorbent slurry liquid contained in the reactor 1 to form a liquid/solid/gas three phase mixed region (jet bubbling layer) in which the liquid phase forms a continuous phase, so that the $SO_2$ and the fly ash are removed from the gas almost completely.

The jet bubbling layer is a layer in which gas-liquid contact between bubbles of the flue gas and the absorbent liquid is proceeding and in which the liquid phase forms a continuous phase. Both violent gas-liquid contact as a result of the splitting of bubbles caused upon impingement of the gas against the absorbing liquid by its energy and efficient gas-liquid contact as a result of violent deformation of the split bubbles in the jet bubbling layer are effected. Thus, in the jet bubbling in which the liquid phase forms a continuous phase and in which the gas-liquid cotact is effected, a high efficiecy of gas-liquid contact is attainable. Further, the height of the gas-liquid contact layer is 1 m or less so that compactness may also be attained.

As a consequence, even when the pH of the absorbent slurry liquid is kept in the range of 3–5, it is possible to maintain a required $SO_2$ removal rate of at least 95%. Thus, the utilization of the limestone becomes high while suppressing the amount of unreacted limestone generally to no more than 1% by weight. The presence of HF and HCl scarcely adversely affects the removal rate and utility factor. Moreover, since the flue gas is humidified and saturated, the wall of the pipe is always wet with water, so that no deposition of solids occurs on the inside walls due to the evaporation and concentration of the substances dissolved in the absorbing liquid which are caused in the interface of the gas-liquid phase between the flue gas and the absorbent liquid in the pipe.

The removal of the air pollutants such as $SO_2$ is effected in two stages of absorption by the high speed continuous-gas stream within the pipe and by the jet bubble stream ejected from the pipe. Therefore, the depth of immersion of the gas injecting pipe (sparger pipe) into the absorbing liquid becomes relatively shallow, so that the costs of the electric power required for the flue gas supplying fan is minimized. Especially, when the absorption is carried out in such a manner that gas bubbles are surrounded by the liquid, probability of the contact becomes so high that the air pollutants are removed effectively and the amount of the fly ash becomes less than 5 mg/Nm$^3$. The limestone is supplied to the apparatus after being formed into a slurry. When this slurry having a high pH value is sprayed into the gas leaving the pool of the absorbent slurry liquid, the $SO_2$ remaining in the gas is absorbed by the slurry so that the $SO_2$ removal rate is improved to that extent and a high performance apparatus can be obtained.

To the gas leaving the jet bubbling layer, a mixture of limestone and a mother liquor and/or the absorbing liquid is sprayed from a nozzle 21 via conduits 9, 14 and 18. While the amount of this slurry is small, the $SO_2$ remaining in the gas is efficiently removed because the pH thereof is high. After removal of entrainments in a mist eliminator 5, the purified gas is discharged to the atmosphere from a discharge pipe 6.

Simultaneously with the absorption of the $SO_2$ in the absorbing liquid, it is oxidized with air injected through a conduit 10 and a nozzle 22 into the absorbing liquid in the bottom of the reactor 1 to form sulfuric acid, so that the absorbing liquid becomes acidic. Because the absorbing liquid is acidic, the limestone supplied from the nozzle 21 is quickly dissolved therein and reacts swiftly with the sulfuric acid to form gypsum. Therefore, the content of unreacted calcium sulfite and unreacted limestone in the absorbing liquid is low. Consequently, the system is free of the formation of hard scales which would otherwise be caused by the formation of gypsum as a result of the reaction of unreacted materials contained in the absorbing liquid entrainments which deposit in the mist eliminator 5 with $SO_2$ and $O_2$ contained in the exhaust gas. The gypsum contained in the absorbing liquid in an amount of 5-30% serves as seed crystals and can reduce the supersaturation of gypsum in the absorbing liquid. Thus, gypsum appears on the surface of the seed crystals rather than on the walls of the equipment, so that scaling by the formation of precipitates of gypsum can be avoided. The gypsum thus formed is discharged through a conduit 15 so as to adjust the concentration thereof in the absorbing liquid to 5-30% and is introduced into a gypsum separator 7 for recovery.

A portion of the mother liquor separated in the gypsum separator 7 is withdrawn through conduits 16 and 17 so as to keep the concentration of calcium chloride, calcium fluoride and fly ash constant. The mother liquor is fed to a fly ash separator 8 for the removal of the fly ash and calcium fluoride and is then discharged from the system as waste water.

According to the present invention, HCl, HF and fly ash contained in flue gas in addition to $SO_2$ can be treated at the same time without prior, separate removal. Neither HCl nor HF adversely affects the reactivity of $CaCO_3$. Moreover, since the removal of $SO_2$ is effected in two stages in the high speed sprayed stream in the pipe and in the high speed bubbling flow outside of the pipe, a high desulfurization rate can be obtained. Since the two stages can be operated in a compact space inside and outside of a single pipe, the apparatus becomes simple and economical. In addition, since the two stage absorption permits the gas-liquid contact to be performed effectively, a desired $SO_2$ removal rate can be attained even when the pH of the absorbing liquid is set at a low level. There is also obtained the merit that the cost for the apparatus can be suppressed since, of the two high speed sprayed flows, one of them also serves to effect gas-liquid direct contact for the purpose of cooling and humidifying the flue gas and the other also serves to provide the system with the absorbent such as limestone.

The following example will further illustrate the present invention but does not limit the scope of claims thereto in any way.

EXAMPLE

The type of the apparatus used for the treatment of flue gas was as shown in FIG. 2. A reactor 1 having circular cross section had a diameter of 1000 mm. The height of the liquid was 2000 mm. As sparger pipes, 12 tubes with diameters of 4 inches were used. The injection ports of the tubes were set at a depth of about 100 mm. Flue gas containing 800 ppm of $SO_2$, 80 mg/$Nm^3$ of dust, 3% of $O_2$, 90 mg/$Nm^3$ of HCl and 170 mg/$Nm^3$ of HF was introduced through a flue gas feed pipe 2 at a rate of 4000 $Nm^3$/h into a gas humidifying and cooling device 3 where an absorbing liquid having a gypsum content of 10-20% and supplied from a reactor 1 through conduits 12 and 13 was sprayed from a spray nozzle 20 at feed rate of 4 $m^3$/h. The flue gas was fed to the sparger pipes 4 together with the sprayed slurry and jet bubbled into the absorbing liquid in the reactor 1 therefrom to remove $SO_2$, dust, HCl and HF. To the gas leaving the jet bubbling layer, a mixed slurry of about 10 kg/h of limestone, mother liquor and the absorbing liquid fed through conduits 9, 14 and 18 was sprayed from a nozzle 22 at a rate of 2 $m^3$/h. After removing entrainments in a mist eliminator 5, the gas was discharged out of the system as a purified gas.

The $SO_2$ thus absorbed was oxidized by air supplied through a conduit 10 and injected into the absorbing liquid from a nozzle 22 to form sulfuric acid which, in turn, was converted into gypsum by reaction with the above-mentioned limestone. The thus formed gypsum was discharged through a conduit 15 so as to maintain the concentration thereof in the absorbing liquid in the range of 10-20% and was introduced into a gypsum separator 7 for the recovery thereof.

As a result of the foregoing treatment of the flue gas, a high desulfurization rate of 93-96% was obtained. The concentration of dust at the exit was found to be 1-5 mg/$Nm^3$, indicating that a high dust removal efficiency is obtainable. The concentrations of HCl and HF at the exit were trace. The grade of the gypsum recovered was high as shown below:

TABLE 1

| | |
|---|---|
| $CaSO_4.2H_2O$ | 98.9% (except dust) |
| $CaCO_3$ | 0.6% |
| $CaSO_3$ | trace |
| pH | 6-7 |
| Average particle size | 60-80 $\mu$ |

In order to examine the desulfurization effect by the spraying of the absorbing liquid from the nozzles 20 and 21, the feed of the absorbing liquid to the nozzles 20 and 21 was stopped. Instead, limestone was fed at a position adjacent to the lower end of the sparger pipe through one inch pipe. As a result, the desulfurization rate was decreased to 87-90%. When the immersion depth of the sparger pipes 4 in the liquid was increased to 200 mm, a desulfurization rate of 93-96% was obtainable. Thus, it was revealed that the spraying of the absorbing liquid from the nozzles 20 and 21 was effective in considerably reducing the consumption of electric power by the flue gas feed fan. Deposits were observed on the inside wall of the sparger pipes 4 when the spraying of the slurry from the nozzle 20 stopped and, therefore, it was impossible to continue the operation for a long period of time.

What is claimed is:

1. A process for treating a flue gas containing air pollutants including sulfur dioxide and fly ash, comprising the steps of:
   (a) spraying an aqueous absorbent containing gypsum as well as a calcium compound into a scrubber for direct contact of the spray with the flue gas and accumulating the aqueous absorbent as a pool in the bottom of the scrubber;
   (b) passing the sprayed flue gas through a vertical, open-ended pipe, said flue gas forming an annular jet stream within said pipe, said annular jet stream having a continuous gas phase with liquids and solids dispersed therein, so that portions of the $SO_2$ and the fly ash contained in the flue gas are transferred to the liquid;
   (c) sparging said annular jet stream from the above vertical, open-ended pipe into said pool of aqueous absorbent to form a region of mixed liquid/solid/gas phases, which region contains fine bubbles in a continuous liquid phase, so that a greater part of the $SO_2$ and the fly ash are removed from the gas;
   (d) dispersing air into said pool in said scrubber below said region to provide streams of fine oxygen-containing gas bubbles throughout the whole vessel including said region, so that the absorbed $SO_2$ and other sulfites are oxidized to form coarse gypsum crystals while chemical oxygen demand (COD) of said absorbent is reduced; and
   (e) withdrawing a portion of the aqueous absorbent from said pool to maintain the concentration of the gypsum in a predetermined range.

2. A process according to claim 1 additionally comprising humidifying and cooling said flue gas prior to (b).

3. A process according to claim 1 wherein said calcium compound is limestone or slaked lime.

4. A process according to claim 1 additionally comprising spraying a scrubbing liquid into said scrubber for contact with the gas emanating from said pool.

5. A process according to claim 4 wherein said scrubbing liquid comprises said aqueous absorbent and an additional amount of said calcium compound.

6. The process of claim 5 wherein the pH of said pool of aqueous absorbent is 3–5.

* * * * *

UNITED STATES PATENT AND TRADEMARK OFFICE
CERTIFICATE OF CORRECTION

PATENT NO. : 4,911,901
DATED : March 27, 1990
INVENTOR(S) : OGAWA et al

It is certified that error appears in the above-identified patent and that said Letters Patent is hereby corrected as shown below:

Col. 1, line 20, after "apparatus" insert --for--;
       line 43, after "neither" insert --type of tower is--.

Col. 4, line 47, "phase" should read --phases--.

Signed and Sealed this

Twenty-fifth Day of June, 1991

Attest:

HARRY F. MANBECK, JR.

Attesting Officer

Commissioner of Patents and Trademarks